(12) United States Patent
Xie et al.

(10) Patent No.: US 12,101,674 B2
(45) Date of Patent: Sep. 24, 2024

(54) SWITCHING METHOD BASED ON CONDITIONAL HANDOVER (71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Fang Xie, Beijing (CN); Guangyi Liu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 387 days.

(21) Appl. No.: 17/610,469

(22) PCT Filed: Jun. 17, 2020

(86) PCT No.: PCT/CN2020/096500
§ 371 (c)(1),
(2) Date: Nov. 11, 2021

(87) PCT Pub. No.: WO2020/253706
PCT Pub. Date: Dec. 24, 2020

(65) Prior Publication Data
US 2022/0232438 A1 Jul. 21, 2022

(30) Foreign Application Priority Data
Jun. 17, 2019 (CN) .......................... 201910522155.4

(51) Int. Cl.
H04W 36/00 (2009.01)
H04W 36/24 (2009.01)
H04W 36/36 (2009.01)

(52) U.S. Cl.
CPC ...... *H04W 36/0079* (2018.08); *H04W 36/249* (2023.05); *H04W 36/362* (2023.05)

(58) Field of Classification Search
CPC ........................................... H04W 36/00–385
See application file for complete search history.

(56) References Cited

U.S. PATENT DOCUMENTS

2013/0017834 A1    1/2013  Han
2013/0336284 A1*  12/2013  Hiscock ............... H04W 8/183
                                                  709/225

(Continued)

FOREIGN PATENT DOCUMENTS

CN        102369760 A       3/2012
CN        107113673 A       8/2017

(Continued)

OTHER PUBLICATIONS

Cambridge Dictionary meaning of "when", 14 pages, printed on Jul. 18, 2023. Retrieved from Internet: <https://dictionary.cambridge.org/us/dictionary/english/when>. (Year: 2023).*

(Continued)

*Primary Examiner* — Ronald Eisner
(74) *Attorney, Agent, or Firm* — Cooper Legal Group, LLC (57) ABSTRACT The present disclosure provides a switching method, an indication method, a terminal, and a network side device. The switching method applied to the terminal comprises: executing a switching command sent by the network side (Continued)

device; and in the case that switching fails and the terminal is configured with conditional switching, executing a conditional switching process.

11 Claims, 3 Drawing Sheets

(56) References Cited

U.S. PATENT DOCUMENTS

| | | | |
|---|---|---|---|
| 2015/0350969 A1 | 12/2015 | Dudda et al. | |
| 2018/0124656 A1* | 5/2018 | Park | H04W 36/0016 |
| 2019/0380081 A1* | 12/2019 | Chang | H04W 36/08 |
| 2020/0084683 A1* | 3/2020 | Moosavi | H04W 36/249 |
| 2021/0297909 A1 | 9/2021 | Lee et al. | |

FOREIGN PATENT DOCUMENTS

| | | | |
|---|---|---|---|
| CN | 108810960 A | 11/2018 | |
| CN | 108882316 A | 11/2018 | |
| CN | 109076408 A | 12/2018 | |
| CN | 109392039 A | 2/2019 | |
| CN | 110999390 A | 4/2020 | |
| EP | 3639560 A1 | 4/2020 | |
| WO | 2018133036 A1 | 7/2018 | |
| WO | 2018212688 A1 | 11/2018 | |
| WO | 2018230997 A1 | 12/2018 | |
| WO | WO-2019029015 A1 * | 2/2019 | ........ H04W 36/0016 |
| WO | 2019070174 A1 | 4/2019 | |
| WO | 2019098910 A1 | 5/2019 | |

OTHER PUBLICATIONS

Supplementary European Search Report in the European application No. 20827127.0, mailed on May 27, 2022, 10 pgs.
International Search Report in the international application No. PCT/CN2020/096500, mailed on Sep. 2, 2020, 2 pgs.
English translation of the Written Opinion of the International Search Authority in the international application No. PCT/CN2020/096500, mailed on Sep. 2, 2020, 5 pgs.
Ericsson: "CHO Preparation—Summary of offline discussion", 3GPP Draft; R3-201159, vol. RAN WG3, No. E-meeting; Feb. 24, 2020-Mar. 6, 2020, Mar. 8, 2020 (Mar. 8, 2020), XP051861490, the whole document. 7 pages.

* cited by examiner

SWITCHING METHOD BASED ON CONDITIONAL HANDOVER

CROSS-REFERENCE TO RELATED APPLICATION

The application claims priority to Chinese Patent Application No. 201910522155.4, filed on Jun. 17, 2019, the disclosure of which is hereby incorporated by reference in its entirety.

TECHNICAL FIELD

Embodiments of the disclosure relate to the technical filed of communications, and in particular, to a handover method, an indication method, a terminal, and a network-side device.

BACKGROUND

In a mobile communication system, when a terminal in communication moves from one cell to another, or the link quality of a serving cell of the terminal deteriorates, the terminal may perform a cell Handover (HO) to ensure the continuity of communication.

At present, a network-side device determines whether the terminal has a requirement for cell HO based on a measurement report reported by the terminal, and when determining that the terminal has the requirement for cell HO, the network-side device sends an HO command to the terminal, so as to instruct the terminal to perform a cell HO. In the related art, if an HO fails, the terminal performs a Radio Resource Control (RRC) reestablishment, which results in the high failure rate of HO.

SUMMARY

The embodiments of the disclosure provide a handover method, an indication method, a terminal, and a network-side device to solve the problem in the related art that the terminal performs an RRC reestablishment after failing to execute an HO command, which results in the high failure rate of HO.

To solve the above problem, the disclosure is implemented as follows.

In a first aspect, the embodiments of the disclosure provide a handover method, which is applied to a terminal and may include the following operations.

An HO command sent by a network-side device is executed.

When an HO fails and the terminal is configured with a Condition Handover (CHO), a CHO is performed.

In a second aspect, the embodiments of the disclosure provide an indication method, which is applied to a network-side device and may include the following operation.

First indication information is sent to the terminal. The first indication information is used for instructing the terminal to perform the CHO when the terminal fails in executing the HO and is configured with the CHO.

In a third aspect, the embodiments of the disclosure also provide a terminal, which may include a processor.

The processor is configured to:
 execute the HO command sent by the network-side device; and
 when the HO fails and the terminal is configured with the CHO, perform the CHO.

In a fourth aspect, the embodiments of the disclosure also provide a network-side device, which may include a transceiver.

The transceiver is configured to send the first indication information to the terminal. The first indication information is used for instructing the terminal to perform the CHO when the terminal fails in executing the HO and is configured with the CHO.

In a fifth aspect, the embodiments of the disclosure also provide a terminal, which may include: a second processor, a first memory and a first computer program which is stored in the first memory and executable by the second processor. When executed by the second processor, the first computer program implements the steps of the above handover method.

In a sixth aspect, the embodiments of the disclosure also provide a network-side device, which may include: a third processor, a second memory and a second computer program which is stored in the second memory and executable by the third processor. When executed by the third processor, the second computer program implements the steps of the above indication method.

In a seventh aspect, the embodiments of the disclosure also provide a computer readable storage medium, in which a third computer program is stored. When executed by a fourth processor, the third computer program implements the steps of the above handover method, or the steps of the above indication method.

In the embodiments of the disclosure, when the terminal executes the HO command sent by the network-side device and the HO fails, if it is configured with the CHO, it may continue to perform the CHO, thereby improving the probability of the terminal accessing to the target cell and then reducing the failure rate of HO.

BRIEF DESCRIPTION OF THE DRAWINGS

In order to more clearly illustrate technical solutions in embodiments of the disclosure, the drawings needed in the descriptions of the embodiments are simply introduced below. It is apparent that the accompanying drawings in the following description are only some embodiments of the disclosure, for the ordinary skill in the art, some other accompanying drawings can also be obtained according to these drawings without creative effort.

DETAILED DESCRIPTION

The technical solutions in the embodiments of the disclosure will be described clearly and completely below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

Terms "first", "second" and the like in the disclosure are adopted to distinguish similar objects and not intended to describe a specific sequence or order. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead. In the disclosure, "and/or" is used to indicate at least one of the connected objects. For example, A and/or B and/or C indicates seven cases, that is, individual A is included, individual B is included, individual C is included, both A and B exist, both B and C exist, both A and C exist, and A, B, and C all exist.

Figure 1:
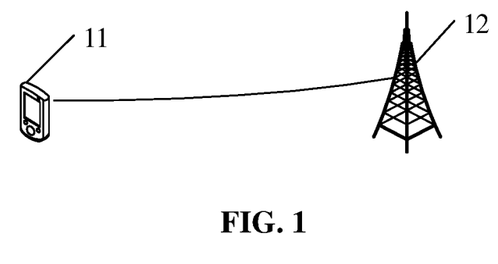
FIG. 1 is a structure diagram of a network system applicable to the embodiments of the disclosure.

As shown in FIG. 1 which is a structure diagram of a network system applicable to the embodiments of the disclosure, the network system includes a terminal 11 and a network-side device 12 that may communicate with each other.

In the embodiments of the disclosure, the terminal 11 may also be called User Equipment (UE). In practical applications, the terminal 11 may be a mobile phone, a tablet personal computer, a laptop computer, a Personal Digital Assistant (PDA), a Mobile Internet Device (MID), a wearable device or vehicle-mounted device, etc. The network-side device 12 may be an eNodeB (eNB), a relay, an access point, or other network elements. The eNB may be a source eNB or a target eNB of the terminal.

For ease of understanding, some contents involved in the embodiments of the disclosure are described below.

CHO is that when the UE cannot receive an HO command normally and thus cannot complete an HO process because a channel between UE and a serving cell suddenly deteriorates (especially in the case of high frequency or when the terminal moves rapidly), the network-side device may configure that the UE triggers measurement reporting at a relatively low threshold, and carries a threshold for triggering an HO in the HO command. The network-side device may also carry a random access resource used by the UE in a target cell. Once an HO threshold is met, the UE may initiate a random access process to the target eNB.

Figure 2:
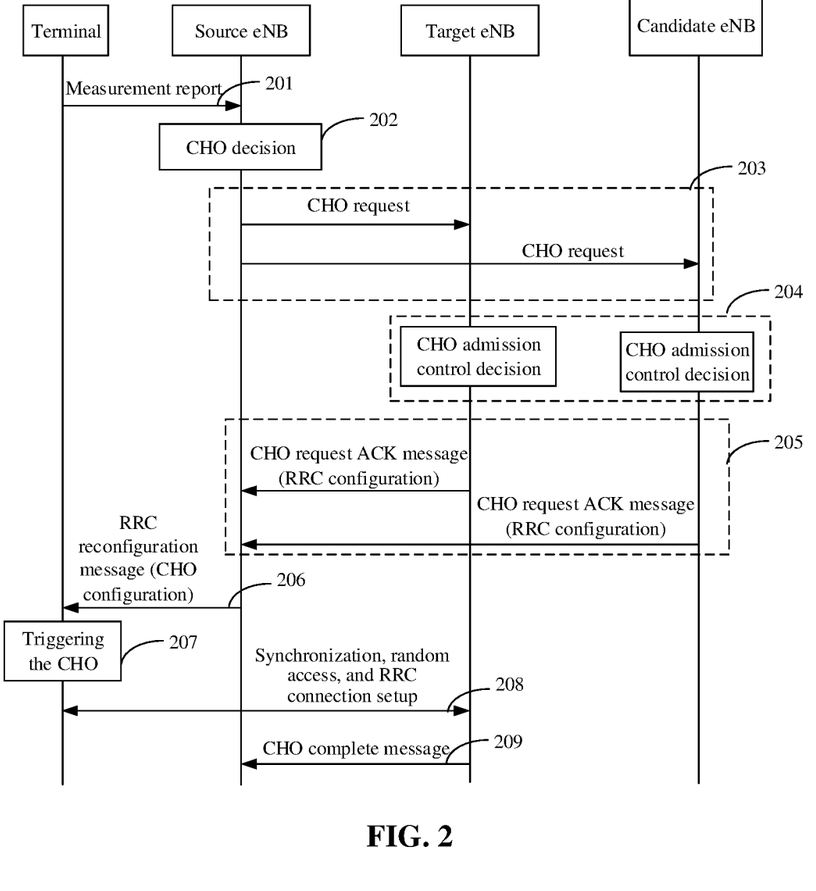
FIG. 2 is a flowchart of an HO provided by an embodiment of the disclosure.

As shown in FIG. 2 which is a flowchart of a CHO provided by an embodiment of the disclosure, a CHO may include the following steps.

At S201, a terminal sends a measurement report to a source eNB.

At S202, the source eNB performs CHO decision.

At S203, when it is determined to configure the CHO, the source eNB sends a CHO request to the target eNB and/or other candidate eNBs.

At S204, after receiving the CHO request, the target eNB and/or other candidate eNBs perform CHO admission control decision.

At S205, in case of admission of the CHO, the target eNB and/or other candidate eNBs send a CHO request acknowledgment (ACK) message to the source eNB.

The CHO request ACK message may include RRC configuration, etc.

At S206, the source eNB sends an RRC reconfiguration message carrying CHO configuration to the terminal.

At S207, when a trigger condition is met, the terminal triggers the CHO.

At S208, the terminal performs synchronization, random access, RRC connection setup and other processes with the target eNB.

At S209, the target eNB sends a CHO complete message to the source eNB.

It is to be noted that after the network-side device configures the CHO for the terminal, if the UE receives a common HO command sent by the network-side device when waiting for the trigger of the CHO, the UE executes a common HO command immediately.

Figure 3:
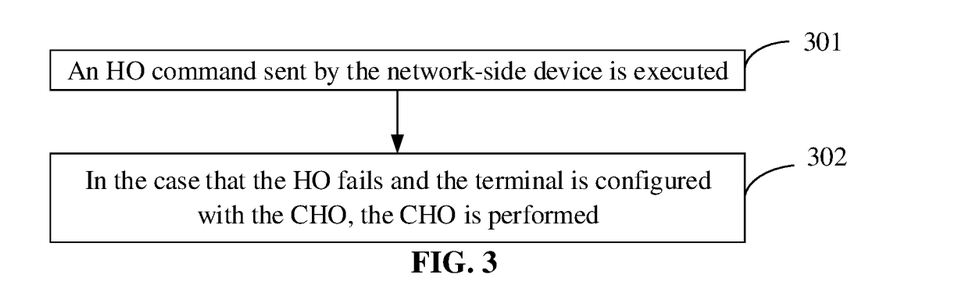
FIG. 3 is a flowchart of a handover method provided by an embodiment of the disclosure.

FIG. 3 is a flowchart of a handover method provided by an embodiment of the disclosure. The handover method of the embodiments of the disclosure may be applied to the terminal. As shown in FIG. 3, the handover method may include the following steps.

At S301, the HO command sent by the network-side device is executed.

In the specific implementation, the terminal performs an HO operation after receiving the HO command sent by the network-side device. Specifically, the terminal may fail or succeed in the HO. For example, when the target cell selected by the network-side device for the terminal is not the direction in which the terminal moves, the terminal may fail in the HO. In the case of HO failure, S302 may be performed.

In the embodiments of the disclosure, the HO command may specifically be a common HO command or immediate HO command sent by the network-side device, and may also be an instruction or command sent by other network-side devices to instruct the terminal to perform the HO operation.

At S302, when the HO fails and the terminal is configured with the CHO, the CHO is performed.

In an embodiment of the disclosure, optionally, S302 may include that: when the HO fails, the terminal performs cell selection; and if the result of the cell selection is the target cell for the CHO, and according to network side configuration, the terminal is allowed to perform the CHO after the HO fails, the CHO is performed.

In this way, compared with the direct execution of a cell reestablishment in the case of HO failure, in the specific embodiments of the disclosure, the terminal may perform a cell HO again through the CHO, so the probability of the terminal accessing to the target cell can be improved and then the probability of HO failure is reduced.

In the embodiments of the disclosure, the CHO of the terminal may be configured by the network-side devices, such as the source eNB, the target eNB or other network elements. In specific implementation, the network-side device may configure conditions for the terminal to perform the CHO. The conditions may include, but are not limited to, at least one of: a list of candidate cells; and HO conditions of each candidate cell, such as a threshold of A3 event.

It is to be noted that, the network-side device that configures the CHO for the terminal may be different from the network-side device that sends the HO command to the terminal, for example, the source eNB sends the HO command to the terminal, and the target eNB configures the CHO for the terminal. Of course, the network-side device that configures the CHO for the terminal may also be the same network-side device that sends the HO command to the terminal, which may be determined according to specific requirements and is not limited by the embodiments of the disclosure.

With the handover method of the embodiments of the disclosure, when the terminal executes the HO command sent by the network-side device and the HO fails, if it is configured with the CHO, it may continue to perform the CHO, thereby improving the probability of the terminal accessing to the target cell and then reducing the failure rate of HO.

In the embodiments of the disclosure, in the case of HO failure, the UE may also perform cell selection first. If the selected target cell is the target cell for the CHO, the CHO is performed.

It can be seen from the above that the network-side device may configure the conditions for the terminal to perform the CHO. Therefore, in an implementation mode, when the HO fails and the terminal is configured with the CHO, the terminal may perform the CHO according to the above conditions.

In another embodiment of the disclosure, optionally, that the CHO is performed may include the following operation.

The CHO is performed according to at least one of first indication information sent by the network-side device and a processing policy agreed in advance.

Optionally, the first indication information may include at least one of:

second indication information for instructing the terminal to perform the CHO when the terminal fails in executing the HO and is configured with the CHO;

third indication information for indicating timing information of a timer; if any trigger condition is met before the timer times out, the terminal performs the CHO corresponding to the trigger condition which is met; or else, the terminal performs the cell reestablishment;

fourth indication information for indicating a CHO parameter; and fifth indication information for indicating the target cell for the CHO;

six indication information, which is used for indicating the maximum number of CHOs; if any trigger condition is met before the number of CHOs does not reach the maximum number, the terminal performs the CHO corresponding to the trigger condition which is met; or else, the terminal performs the cell reestablishment; and seventh indication information, which is used for indicating whether the determination meets the maximum number of determinations of the trigger condition of the CHO; if any trigger condition is met before the number of determinations reaches the maximum number of determinations, the terminal performs the CHO corresponding to the trigger condition which is met; or else, the terminal performs the cell reestablishment.

In specific implementation, the timing information of the timer comprises at least one of: timing duration of the timer; and starting conditions of the timer. When the timing information of the timer does not include the timing duration, the timing duration of the timer may be set by default or adjusted by a terminal user. The starting conditions of the timer may be that: the terminal fails in executing the HO and is configured with the CHO.

Optionally, when the first indication information includes the second indication information, S302 may include that: in the case of HO failure, the cell selection is performed; and if the result of the cell selection is the target cell for the CHO, the CHO is performed according to the second indication information.

Optionally, the timing duration of the timer may be correlated with at least one of a movement speed of the terminal and a working frequency of the network where the terminal resides.

Specifically, the timing duration of the timer may be negatively correlated with the movement speed of the terminal, that is, the faster the terminal moves, the shorter the timing duration of the timer. In this way, the faster the terminal moves, the shorter the timing duration of the timer, and the shorter the time interval between the HO failure and the terminal performing the CHO, thus improving the reliability of HO.

The timing duration of the timer may also be negatively correlated with the working frequency of the network where the terminal resides. For example, the timing duration of the timer when the terminal resides in a high-frequency network (e.g. the 5G network) is shorter than that when the terminal resides in a low-frequency network (e.g. the 4G network). In this way, the higher the working frequency of network where the terminal resides, the shorter the timing duration of the timer, and the shorter the time interval between the HO failure and the terminal performing the CHO, thus improving the reliability of HO.

Similar to determining the timing duration of the timer, the maximum number of CHOs may be correlated with at least one of the movement speed of the terminal and the working frequency of the network where the terminal resides. Specifically, the maximum number of CHOs may be negatively correlated with the movement speed of the terminal, that is, the faster the terminal moves, the less the maximum number of CHOs. The maximum number of CHOs may be negatively correlated with the working frequency of the network where the terminal resides. In this way, the faster the terminal moves, the higher the working frequency of network where the terminal resides, the less the maximum number of CHOs, and the fewer times the terminal performs the CHO after the HO failure, thus improving the reliability of HO.

Similar to determining the timing duration of the timer, the maximum number of determinations may be correlated with at least one of the movement speed of the terminal and the working frequency of the network where the terminal resides. Specifically, the maximum number of determinations may be negatively correlated with the movement speed of the terminal, that is, the faster the terminal moves, the less the maximum number of determinations. The maximum number of determinations may be negatively correlated with the working frequency of the network where the terminal resides. In this way, the faster the terminal moves, the higher the working frequency of network where the terminal resides, the less the maximum number of determinations, and the fewer times the terminal performs the CHO after the HO failure, thus improving the reliability of HO.

It is to be noted that the network-side device may configure the CHO for multiple target cells, and the trigger conditions of the CHO for each target cell may be different. Therefore, when any trigger condition is met, the terminal performs the CHO corresponding to the trigger condition which is met. For example, it is assumed that the network-side device configures the CHO of target cell 1 and target cell 2, the trigger condition of CHO of the target cell 1 is trigger condition a, and the trigger condition of CHO of the target cell 2 is trigger condition b. If the trigger condition b is met before the timer times out, the terminal may perform the CHO in the target cell 2.

In specific implementation, the CHO parameters may include the following operation.

A new CHO determination threshold, for example, a new threshold of A3 event; or, an adjustment amount of conditional determination threshold, for example, the threshold of A3 event is reduced by 20%.

In specific implementation, the target cell indicated by the fifth indication information may be determined by the network-side device according to a measurement result reported by the terminal.

In practical applications, optionally, the first indication information may be transmitted through, but not limited to, the HO command or the RRC reconfiguration message.

The processing policy agreed in advance may include at least one of the following processing policies:
  a first processing policy, that is, when the terminal fails in executing the HO and is configured with the CHO, the CHO is performed;
  a second processing policy, that is, when the terminal fails in executing the HO and is configured with the CHO, the CHO parameter is updated, and the CHO is performed according to the CHO parameter;
  a third processing policy, that is, when the terminal fails in executing the HO and is configured with the CHO, the timer is started; if any trigger condition is met before the timer times out, the CHO corresponding to the trigger condition which is met is performed; or else, the cell reestablishment is performed.

It can be seen from the above that the terminal may perform the CHO according to at least one of the first indication information sent by the network-side device and the processing policy agreed in advance. For ease of understanding, cases in which the terminal performs the CHO according to the first indication information, the terminal performs the CHO according to the processing policy agreed in advance, and the terminal performs the CHO according to the first indication information and the processing policy agreed in advance are described below.

In the first case, the CHO is performed according to the first indication information sent by the network-side device.

In the first case, optionally, that the CHO is performed according to at least one of the first indication information sent by the network-side device and the processing policy agreed in advance includes at least one of:
  when the first indication information received from the network-side device comprises the second indication information, the CHO is performed;
  when the first indication information received from the network-side device comprises the third indication information, the timer is started; if any trigger condition is met before the timer times out, the CHO corresponding to the trigger condition which is met is performed; or else, the cell reestablishment is performed;
  when the first indication information received from the network-side device comprises the fourth indication information, the CHO parameter is used to perform the CHO; and
  when the first indication information received from the network-side device comprises the fifth indication information, the CHO is performed in the target cell.

In specific implementation, the second indication information may include a first field or a second field. The first field is used for instructing the terminal to perform the CHO when the HO fails and the CHO is configured. The second field is used for instructing the terminal to perform the cell reestablishment when the HO fails and the CHO is configured.

In this scenario, when the second indication information including the first field is received, the terminal may perform the CHO when the HO fails and the CHO is configured; when the second indication information including the second field is received, the terminal may perform the cell reestablishment when the HO fails and the CHO is configured.

It is to be noted that in the first case, if the first indication information received by the terminal does not include the second indication information, but includes other indication information except the second indication information, the first indication information implicitly indicates that the terminal may perform the CHO when the HO fails and the CHO is configured. In this way, the terminal may perform the CHO according to the first indication information.

In addition, when the first indication information includes two or more than two pieces of other indication information except the second indication information, the terminal may perform the CHO in combination with the indication information included in the first indication information.

Exemplarily, if the first indication information includes the fourth indication information and the seventh indication information, the fourth indication information indicates the adjustment amount of the conditional determination threshold, and the maximum number of determinations indicated by the seventh indication information is 3, the terminal may adjust the conditional determination threshold for judging each time according to the above adjustment amount in a descending manner. For example, in the case of two determinations, the conditional determination threshold of the first determination may be greater than the conditional determination threshold of the second determination by an adjustment amount. In this way, the terminal is more easily meet the trigger condition of CHO, and then perform the CHO corresponding to the trigger condition.

If the first indication information includes the third indication information and the fifth indication information, the terminal may perform, when any trigger condition is met before the timer times out, the CHO corresponding to the trigger condition which is met in the target cell indicated by the fifth indication information.

It is to be noted that, in the first case, when the terminal does not receive the first indication information, even if the terminal fails to perform the HO and is configured with the CHO, the terminal performs the cell reestablishment.

In the second case, the CHO is performed according to the processing policy agreed in advance.

In the second case, optionally, that the CHO is performed according to at least one of the first indication information sent by the network-side device and the processing policy agreed in advance includes at least one of:
  when the processing policy includes the first processing policy, the CHO is performed.

When the processing policy includes the second processing policy, the CHO parameter is updated, and the CHO is performed according to the updated parameter.

When the processing policy includes the third processing policy, the timer is started. When it is determined that the trigger condition is met before the timer times out, if any trigger condition is met before the timer times out, the CHO corresponding to the trigger condition which is met is performed; or else, the cell reestablishment is performed.

It is to be noted that, in the second case, if the processing policy does not include the first processing policy, but includes other processing policies except the first processing policy, the processing policy implicitly indicates that the terminal may perform the CHO when the HO fails and the CHO is configured. In this way, the terminal may perform the CHO according to the processing policy.

In the third case, the CHO is performed according to the first indication information and the processing policy agreed in advance.

In the third case, considering that the processing policy is agreed in advance and has low flexibility, the terminal may perform the CHO in combination with the first indication information and the processing policy agreed in advance.

For example, the processing policy may include that: the terminal performs the CHO when it fails to perform the HO and is configured with the CHO, and the target cell, the timing duration of the timer, the CHO determination threshold and other information may be controlled by the network-side device, thereby further reducing the failure rate of HO.

Figure 4:
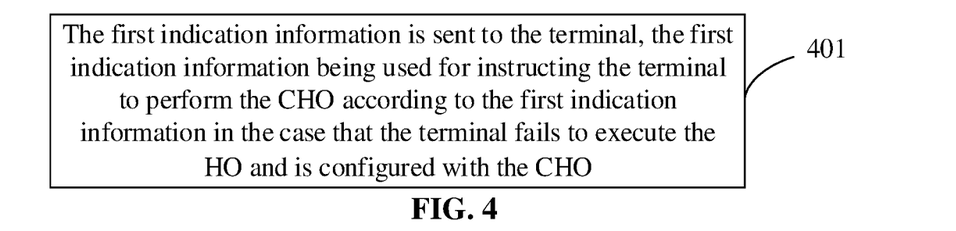
FIG. 4 is a flowchart of an indication method provided by an embodiment of the disclosure.

FIG. 4 is a flowchart of an indication method provided by an embodiment of the disclosure. The indication method of the embodiments of the disclosure may be applied to the network-side device. As shown in FIG. 4, the indication method may include the following steps.

At S401, the first indication information is sent to the terminal. The first indication information is used for instructing the terminal to perform the CHO when the terminal fails in executing the HO and is configured with the CHO.

Optionally, the first indication information is transmitted through the HO command or the RRC reconfiguration message.

Optionally, the first indication information includes at least one of:
  the second indication information for instructing the terminal to perform the CHO when the terminal fails in executing the HO and is configured with the CHO;
  the third indication information for indicating the timing information of the timer; if any trigger condition is met before the timer times out, the terminal performs the CHO corresponding to the trigger condition which is met; or else, the terminal performs the cell reestablishment;
  the fourth indication information for indicating the CHO parameter; and
  the fifth indication information for indicating the target cell for the CHO.

It is to be noted that as the implementation mode of the network-side device corresponding to the above method embodiment, the present embodiment may refer to the related description in the above method embodiment, and may achieve the same beneficial effect. For avoiding repetitions, elaborations are omitted herein.

In the indication method of the embodiments of the disclosure, the network-side device sends the first indication information to the terminal, then the terminal may perform the CHO when it fails to execute the HO command and is configured with the CHO, thereby improving the probability of the terminal accessing to the target cell and then reducing the failure rate of HO.

It is to be noted that the various optional embodiments described in the embodiments of the disclosure may be realized in combination with each other or independently, which is not limited by the embodiments of the disclosure.

For ease of understanding, examples are described below.

At S1, the network-side device, for example, the source eNB or the target eNB or other network elements, configures the conditions for the UE to perform the CHO, which may include a list of candidate cells, and/or the corresponding HO conditions, such as the threshold of A3 event.

At S2, the network-side device, for example, the source eNB or the target eNB or other network elements, sends the common HO command to the UE.

At S3, the network-side device, for example, the source eNB or the target eNB or other network elements, sends to the UE one or more of:
  a) the first indication information, which represents that the UE my fall back or perform the CHO;
  b) the timer; if the speed of the terminal is high, the timing duration of the timer is shorter; or else, the timing duration is longer; if the network where the terminal resides is at high frequency, the timing duration of the timer is shorter;
  c) a threshold adjustment parameter of the CHO, which may be an absolute adjustment value or a relative adjustment value; and/or, the terminal moves in a proper direction; and
  d) an ID (list) of applicable or inapplicable target cell.

The target cell may be determined according to measurement reporting.

In particular, the above information may be carried by the common HO command or by other information, such as the RRC reconfiguration information.

At S4, the UE performs the common HO and fails.

At S5, the UE judges based on the information in S3; if the information carries the first indication information, it is indicated that the UE may perform the CHO, and then the UE judges, in combination with the cell selection and the measurement result, whether there is the condition of CHO met.
  a) Further, if the threshold adjustment parameters of CHO are configured on the network side, such as the new parameter of the A3 event or the delta adjustment amount relative to the original parameter, for example, the threshold of A3 is reduced by 20%, the terminal performs CHO determination after the parameter is adjusted.
  b) If the applicable or inapplicable target cell is also configured at S2, the CHO determination of the CHO is performed only to the configured cell.
  c) If there is the target cell meeting the condition of the CHO, the CHO is performed.
  d) If no cell meets the CHO within a certain time of the timer, cell reestablishment is performed.

With the embodiments of the disclosure, the terminal is allowed to continue to perform the CHO method after the common HO fails, so that the terminal may access to the target cell as soon as possible, thereby reducing the failure rate of HO.

Figure 5:
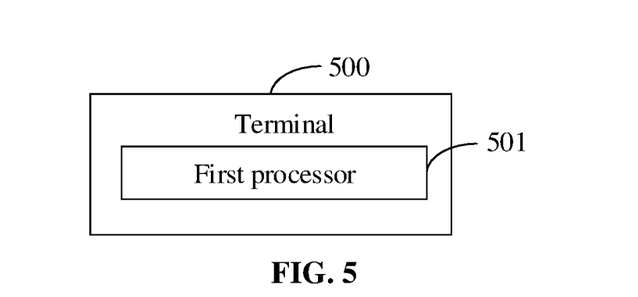
FIG. 5 is a first structure diagram of a terminal provided by an embodiment of the disclosure.

FIG. 5 is a first structure diagram of a terminal provided by an embodiment of the disclosure. As shown in FIG. 5, the terminal 500 may include a first processor 501.

The first processor 501 is configured to:
  execute the HO command sent by the network-side device; and
  when the HO fails and the terminal is configured with the CHO, perform the CHO.

Optionally, the first processor 501 is specifically configured to:
  perform the CHO according to at least one of the first indication information sent by the network-side device and the processing policy agreed in advance.

Optionally, the first indication information is transmitted through the HO command or the RRC reconfiguration message.

Optionally, the first indication information includes at least one of:
  the second indication information for instructing the terminal to perform the CHO when the terminal fails in executing the HO and is configured with the CHO;

the third indication information for indicating the timing information of the timer; if any trigger condition is met before the timer times out, the terminal performs the CHO corresponding to the trigger condition which is met; or else, the terminal performs the cell reestablishment;

the fourth indication information for indicating the CHO parameter; and the fifth indication information for indicating the target cell for the CHO.

Optionally, the first processor 501 is specifically configured to perform at least one of the following operations:

when the first indication information received from the network-side device comprises the second indication information, performing the CHO;

when the first indication information received from the network-side device comprises the third indication information, starting the timer; if any trigger condition is met before the timer times out, performing the CHO corresponding to the trigger condition which is met; or else, performing the cell reestablishment;

when the first indication information received from the network-side device comprises the fourth indication information, using the CHO parameter to perform the CHO; and when the first indication information received from the network-side device comprises the fifth indication information, performing the CHO in the target cell.

The terminal 500 can realize various processes that can be realized by the terminal in the method embodiments of the disclosure and achieve the same beneficial effects. For avoiding repetitions, elaborations are omitted herein.

Figure 6:
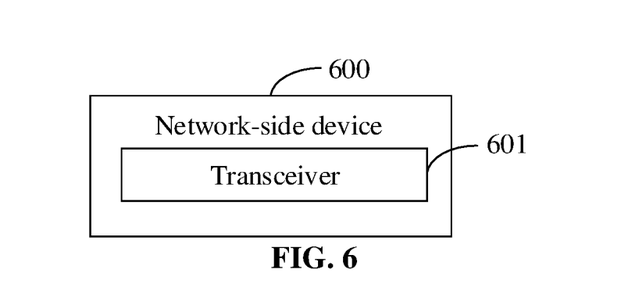
FIG. 6 is a first structure diagram of a network-side device provided by an embodiment of the disclosure.

FIG. 6 is a first structure diagram of a network-side device provided by an embodiment of the disclosure. As shown in FIG. 6, the network-side device 600 may include a transceiver 601.

The transceiver 601 is configured to send the first indication information to the terminal. The first indication information is used for instructing the terminal to perform the CHO when the terminal fails in executing the HO and is configured with the CHO.

Optionally, the first indication information is transmitted through the HO command or the RRC reconfiguration message.

Optionally, the first indication information includes at least one of:

the second indication information for instructing the terminal to perform the CHO when the terminal fails in executing the HO and is configured with the CHO;

the third indication information for indicating the timing information of the timer; if any trigger condition is met before the timer times out, the terminal performs the CHO corresponding to the trigger condition which is met; or else, the terminal performs the cell reestablishment;

the fourth indication information for indicating the CHO parameter; and the fifth indication information for indicating the target cell for the CHO.

The network-side device 600 can realize various processes that can be realized by the network-side device in the method embodiments of the disclosure and achieve the same beneficial effects. For avoiding repetitions, elaborations are omitted herein.

Figure 7:
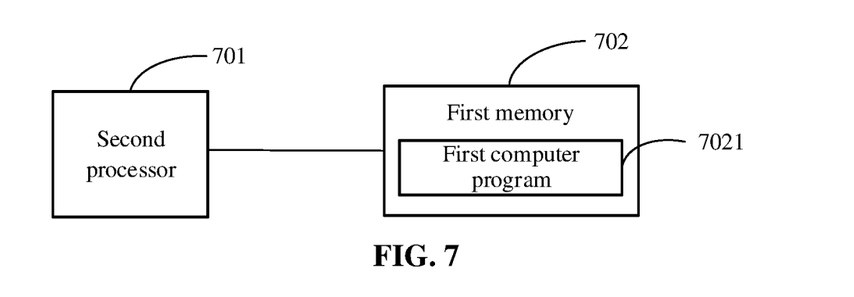
FIG. 7 is a second structure diagram of a terminal provided by an embodiment of the disclosure.

The embodiments of the disclosure also provide a terminal. As shown in FIG. 7, the terminal may include a second processor 701, a first memory 702 and a first computer program 7021 which is stored in the first memory 702 and executable by the second processor 701. When executed by the second processor 701, the first computer program 7021 may implement any step in the method embodiment corresponding to FIG. 3 and achieve the same beneficial effects. Elaborations are omitted herein.

Figure 8:
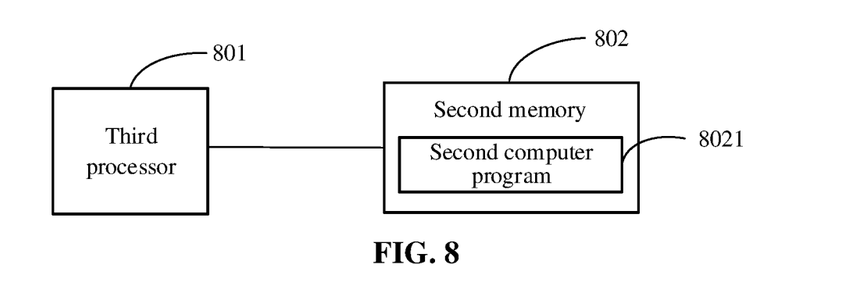
FIG. 8 is a second structure diagram of a network-side device provided by an embodiment of the disclosure.

The embodiments of the disclosure also provide a network-side device. As shown in FIG. 8, the network-side device may include a third processor 801, a second memory 802 and a second computer program 8021 which is stored in the second memory 702 and executable by the third processor 801. When executed by the third processor 801, the second computer program 8021 may implement any step in the method embodiment corresponding to FIG. 4 and achieve the same beneficial effects. Elaborations are omitted herein.

Those of ordinary skill in the art should understand that all or part of the steps in the method of the above embodiment may be completed through related hardware instructed by a program, the program may be stored in a computer readable medium. The embodiments of the disclosure also provide a computer readable storage medium, in which a third computer program is stored. When executed by a fourth processor, the third computer program may implement any step in the method embodiment corresponding to FIG. 3 or FIG. 4 and achieve the same beneficial effects. For avoiding repetitions, elaborations are omitted herein.

The storage medium is a Read-Only Memory (ROM), a Random Access Memory (RAM), a magnetic disk or an optical disc, etc.

The above is only the optional embodiments of the disclosure. It is to be noted that, those ordinary skilled in the art may also make a number of improvements and supplements without departing from the principles of the disclosure, and these improvements and supplements shall fall within the protection scope of the disclosure.

The invention claimed is:

1. A handover (HO) method, applied to a terminal, comprising:
receiving an HO command sent by a network-side device, wherein the HO command is a common HO command or immediate HO command;
performing an HO according to the HO command; and
when the HO fails and the terminal is configured with a Condition Handover (CHO) configuration, performing a CHO according to first indication information sent by the network-side device;
wherein the first indication information comprises second indication information for instructing the terminal to perform the CHO when the terminal fails in performing the HO and is configured with the CHO configuration; and
when the HO fails and the terminal is configured with the CHO configuration, performing the CHO comprises:
in the case of HO failure, performing cell selection; and
when a selected cell is a target cell for the CHO, performing the CHO according to the second indication information.

2. The HO method of claim 1, wherein the first indication information is transmitted through the HO command or a Radio Resource Control (RRC) reconfiguration message.

3. The HO method of claim 1, wherein the first indication information further comprises at least one of:
third indication information for indicating timing information of a timer; wherein when-if any trigger condition is met before the timer times out, the terminal performs the CHO corresponding to the trigger condition which is met; or else, the terminal performs a cell reestablishment;

fourth indication information for indicating a CHO parameter; or fifth indication information for indicating the target cell for the CHO.

4. The HO method of claim 3, wherein performing the CHO according to the first indication information sent by the network-side device further comprises at least one of:
when the first indication information received from the network-side device comprises the third indication information, starting the timer; when any trigger condition is met before the timer times out, performing the CHO corresponding to the trigger condition which is met; or else, performing the cell reestablishment;
when the first indication information received from the network-side device comprises the fourth indication information, performing the CHO by using the CHO parameter; or
when the first indication information received from the network-side device comprises the fifth indication information, performing the CHO in the target cell.

5. A terminal, comprising:
a processor, configured to:
receive a Handover (HO) command sent by a network-side device,
wherein the HO command is a common HO command or immediate HO command;
perform an HO according to the HO command; and
when the HO fails and the terminal is configured with a Condition Handover (CHO) configuration, perform a CHO according to first indication information sent by the network-side device;
wherein the first indication information comprises second indication information for instructing the terminal to perform the CHO when the terminal fails in performing the HO and is configured with the CHO configuration; and
when the HO fails and the terminal is configured with the CHO configuration, the processor is specifically configured to:
in the case of HO failure, perform cell selection; and
when a selected cell is a target cell for the CHO, perform the CHO according to the second indication information.

6. The terminal of claim 5, wherein the first indication information is transmitted through the HO command or a Radio Resource Control (RRC) reconfiguration message.

7. The terminal of claim 5, wherein the first indication information further comprises at least one of:
third indication information for indicating timing information of a timer; wherein when any trigger condition is met before the timer times out, the terminal performs the CHO corresponding to the trigger condition which is met; or else, the terminal performs a cell reestablishment;
fourth indication information for indicating a CHO parameter; or
fifth indication information for indicating the target cell for the CHO.

8. The terminal of claim 7, wherein the processor is further specifically configured to perform at least one of:
when the first indication information received from the network-side device comprises the third indication information, start the timer; when any trigger condition is met before the timer times out, perform the CHO corresponding to the trigger condition which is met; or else, perform the cell reestablishment;
when the first indication information received from the network-side device comprises the fourth indication information, perform the CHO by using the CHO parameter; or
when the first indication information received from the network-side device comprises the fifth indication information, perform the CHO in the target cell.

9. A non-transitory computer readable storage medium having stored thereon a computer program that when executed by a processor, implements the steps of the handover method of claim 1.

10. The HO method of claim 3, wherein the timing information of the timer comprises starting conditions of the timer; and the starting conditions of the timer comprise that the terminal fails in executing the HO and is configured with the CHO.

11. The terminal of claim 7, wherein the timing information of the timer comprises starting conditions of the timer; and the starting conditions of the timer comprise that the terminal fails in executing the HO and is configured with the CHO.

* * * * *